United States Patent

[11] 3,538,883

| [72] | Inventor | Jerry Polin |
| | | Melrose Park, Pennsylvania |
| [21] | Appl. No. | 690,012 |
| [22] | Filed | Dec. 12, 1967 |
| [45] | Patented | Nov. 10, 1970 |
| [73] | Assignee | Alco Standard Corporation |
| | | Cheltenham, Pennsylvania |
| | | a corporation of Ohio |

[54] VACUUM CHUCK WITH SAFETY DEVICE
7 Claims, 8 Drawing Figs.

[52] U.S. Cl. .................................................. 118/6,
82/40; 118/50, 118/52; 279/3; 285/9, 285/332
[51] Int. Cl. ...................................................... B05c 11/08
[50] Field of Search............................................ 118/6, 50,
50.1, 52—56, 500; 279/3; 269/21; 51/235; 285/9,
332; 308/(H); 82/40; 74/(Inq.); 192/18.2; 117/101

[56] References Cited
UNITED STATES PATENTS

| 1,251,541 | 1/1918 | Knight | 269/21X |
| 1,910,513 | 5/1933 | Yancey | 116/55 |
| 1,979,479 | 11/1934 | Leland | 269/21X |
| 2,051,662 | 8/1936 | Wells | 279/3X |
| 2,097,135 | 10/1937 | Schutz | 279/3X |
| 2,792,810 | 5/1957 | Maconeghy et al. | 118/52X |
| 2,833,680 | 5/1958 | Kneeling | 118/52X |
| 3,020,104 | 2/1962 | Nichols | 308/159 |
| 3,052,479 | 9/1962 | Trell | 279/3 |
| 3,463,476 | 8/1969 | De Maria | 269/21 |

*Primary Examiner*—Morris Kaplan
*Attorney*—Howson and Howson

ABSTRACT: A rotary vacuum chuck including a support surface for retaining a workpiece thereon by vacuum effect, is combined with means to rotate the chuck at high rates of speed, means to sense a decrease in vacuum below a predetermined level and means, in response to such detection, to stop rotation of the chuck. A vacuum reservoir applies a sufficient work-holding force between the period of said detection and chuck stoppage.

Patented Nov. 10, 1970

INVENTOR:
JERRY POLIN
BY
Howson & Howson ATTYS.

Patented Nov. 10, 1970
3,538,883
Sheet 2 of 3
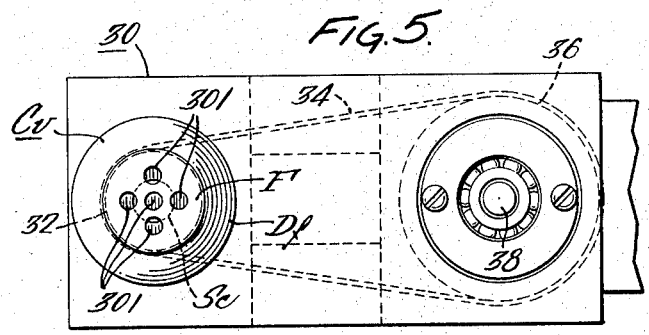
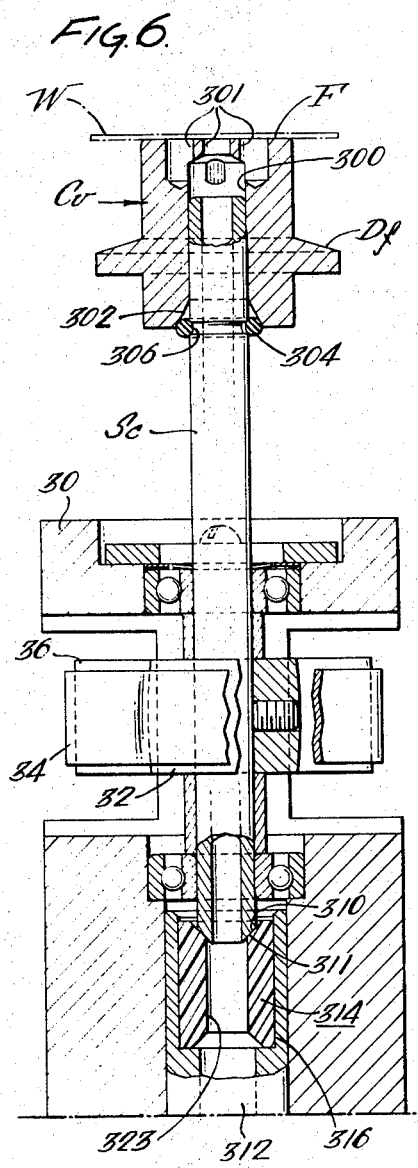
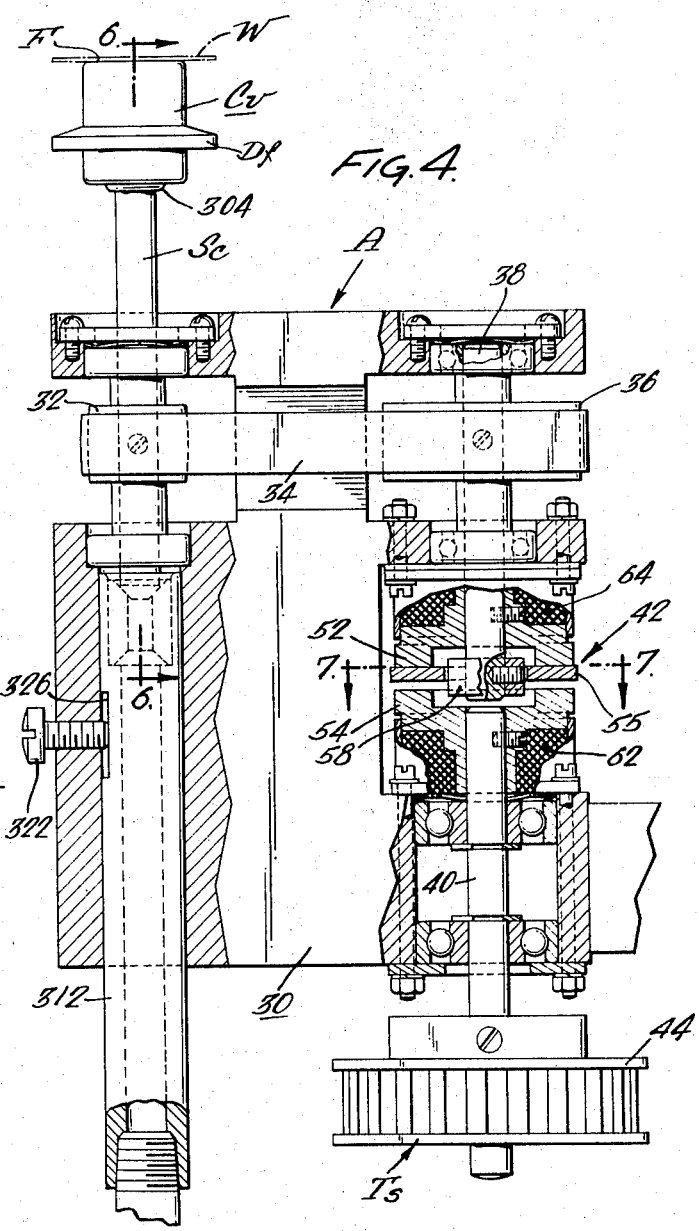
INVENTOR:
JERRY POLIN
BY Howson & Howson ATTYS.

INVENTOR:
JERRY POLIN

VACUUM CHUCK WITH SAFETY DEVICE

The present invention relates to an apparatus for applying a thin, uniform film or layer of a flowable material or substance to a face of a workpiece. More specifically in accordance with the present invention, the workpiece is rotated rapidly and the acceleration and speed of rotation are selectively controlled to provide a layer of the material over the entire face of the workpiece of predetermined uniform thickness.

The present invention has particular applicability in the manufacture of electronic components such as semiconductors, microelectronics and other similar components. One of the steps in the method of making these components is to prepare a substrate such as a thin disclike silicon wafer for a masking operation by applying a flowable photosensitive material to one face of the wafer. The solubility of this photosensitive material in a particular solvent varies with exposure to radiation. Some types of photosensitive material used for this purpose are commonly referred to as photoresist. In some instances after application of the photoresist layer, the wafer is placed on a vacuum plate with the photoresist layer confronting a glass mask held in a fixed position and then the plate is actuated so that the coated face of the wafer engages the patterned face of the mask.

In the past the wafers were coated by several conventional methods including dip coating, wherein the wafers were dipped into a bath of photoresist, spray coating wherein the wafers were simply sprayed with the photoresist, and a roller method wherein the photoresist was rolled on to a surface of the wafer. These prior methods have several disadvantages and drawbacks. For example, in all of these prior methods where a photoresist comprising solids and solvents is used, a further operation is required to drive off the solvents, for example by means of heating in an oven or the use of an air blast. Furthermore, in these prior methods for applying the layer of photoresist substance to a wafer, it was difficult to control the thickness of the photoresist layer and also it was observed that the layer was of nonuniform dimension or thickness across the face of the wafer. In other words, the photoresist tends to build up in a pyramidal shape in some instances which is undesirable for the reason that when the wafer is pressed into pressure-applying relation with the mask, there is the danger of fracturing the wafer. This, of course, is undesirable since the wafers are extremely expensive in some instances. Furthermore, by reason of the nonuniform character of the photoresist layer, excess quantities of the photoresist build up on the mask and render it unsuitable for use after a comparatively short period of time. Moreover, in the masking operation, since the exposure time of the wafer is usually maintained constant, the resolution across the face of the wafer varies due to variation in the cross section of the photoresist layer and accordingly the yield and electrical characteristics of the finished component may be adversely affected. Uniformity of thickness of the photoresist layer and the means for insuring uniformity of thickness are particularly important and critical where a plurality of identical components are being processed. If there is variation in the thickness between identical components there will be unevenness of exposure which may also affect the yield and electrical characteristics of the finished component.

The present invention provides a new and improved means for applying a flowable substance to a workpiece which overcomes the various disadvantages and drawbacks of prior methods. In accordance with the present invention a uniform layer of flowable substance such as photoresist may be formed on one face of the workpiece such as a silicon wafer by depositing a quantity of the photoresist on one face of the wafer and then accelerating the wafer rapidly to a predetermined speed of as high as 10,000 r.p.m. in a predetermined time period, for example 30 ms. or less. It has been found that thickness and evenness or uniformity of the layer of photoresist are functions of acceleration and speed and the present invention contemplates control of acceleration and speed depending on the final thickness of the layer desired and the viscosity of the flowable substance being applied. For example, in the case of photoresist which comprises solvents and a percent of solids the acceleration and speed of the workpiece are selectively controlled to drive off the solvents during rotation of the workpiece and to obtain an even dispersion of the solids across the face of the wafer. Further, by the present method after a predetermined spinning cycle, the layer of photoresist is cured thereby obviating the need for separate heat or air blast operations characteristic of prior methods to drive off the solvents. Thus, the process of coating these wafers is substantially accelerated. Further, since the finished product is characterized by a coating of uniform thickness across the entire face of the wafer, the problems attendant to the masking operation noted above are obviated.

Considering now briefly some of the features of the apparatus of the present invention, the apparatus includes a vacuum chuck having a flat work-supporting face which is mounted on a chuck shaft disposed centrally of a bowl, the chuck shaft being connected through a transmission system to drive means such as a motor. The chuck shaft is hollow and is connected through a suitable means to a vacuum source to hold the workpiece during the spinning operation. An important feature of the present invention is the provision of control means in the transmission system whereby 1 acceleration and the speed may be selectively varied. For example, the control means permits spinning speeds up to 10,000 r.p.m. in 10 ms. or less for a silicon wafer of 1 inch diameter and 0.008 inch thickness or slower acceleration up to the same speed in a greater period of time, for example, 1 second. Further by this arrangement the complete cycle for coating a wafer can be completed in 8 seconds, which is substantially faster than prior methods discussed above. Furthermore in accordance with the present invention the desired acceleration and speed may be controlled accurately to insure a uniform thickness of the photoresist layer when processing a plurality of identical components. Thus, evenness of exposure and substantially identical yield and electrical characteristics of the finished component are insured.

The apparatus of the present invention includes other features which are extremely desirable in coating workpieces such as wafers with a uniform layer of a flowable substance. For example, the parts mounting the rotating chuck are designed to provide a completely sealed system thereby minimizing the possibility of a vacuum leakage which would result perhaps in loss of vacuum to a level where the wafer would be discharged or spun off the chuck and completely destroyed.

Another feature of the invention is the vacuum safety cutoff control so that if the vacuum in the system falls below a predetermined level during the spinning cycle, the clutch in the transmission system connecting the chuck shaft to the prime actuator, namely the motor, is deenergized to immediately stop rotation of the chuck shaft thereby precluding discharge and destruction of the workpiece. In this way, the workpiece is not flung off the chuck which might destroy the workpiece entirely and further, the safety of the operator is not jeopardized.

In addition to the uses of the invention outlined above, it has been found that the apparatus of the present invention also is useful in preparing blood specimens for examination. At present a sample of blood is pressed between two glass slides and the slides are then wiped relative to one another to produce a smear of the blood on one of the slides. It has been found that with this process there is the danger of rupturing some of the blood cells so that they are not suitable for various examinations. Furthermore, the nonuniform thickness of the smear across the slide requires the operator to be selective in what area he observes under a microscope, for example, for purposes of counting cells. In accordance with the present invention by controlling the rate of acceleration and speed, all of the cells remain intact and the thickness of the smear is uniform so that any part of the smear may be examined under the microscope with accuracy. Additionally, since the present invention assures uniformity in thickness of the smear on the slide, electronic counting methods may be used if desired in lieu of the present method.

These and other objects of the present invention and the various features and details of the operation and construction thereof are hereinafter more fully set forth with reference to the accompanying drawings, wherein:

FIG. 4 is an enlarged elevational view partly in section of the vacuum chuck and part of the transmission system;

FIG. 5 is a plan view thereof;

FIG. 6 is an enlarged sectional view taken on line 6–6 of FIG. 4;

FIG. 7 is a transverse sectional view taken on line 7–7 of FIG. 4; and

Figure 1:
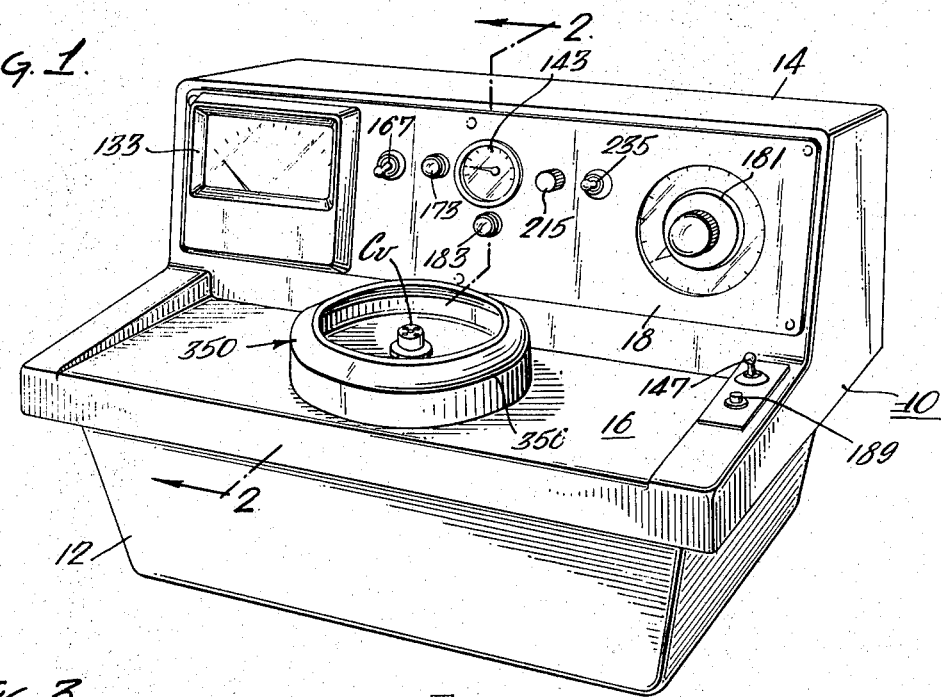
FIG. 1 is a perspective view of apparatus in accordance with the present invention for applying a flowable substance to the face of a workpiece.
Figure 3:
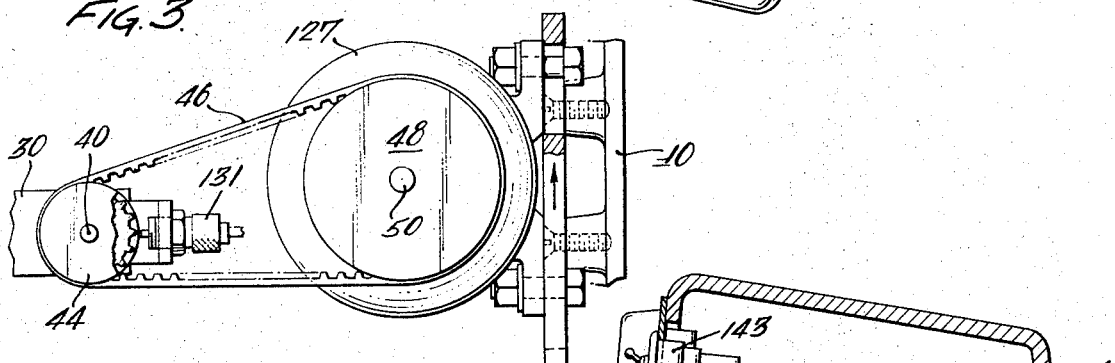
FIG. 3 is a view taken along lines 3–3 of FIG. 2.
Figure 2:
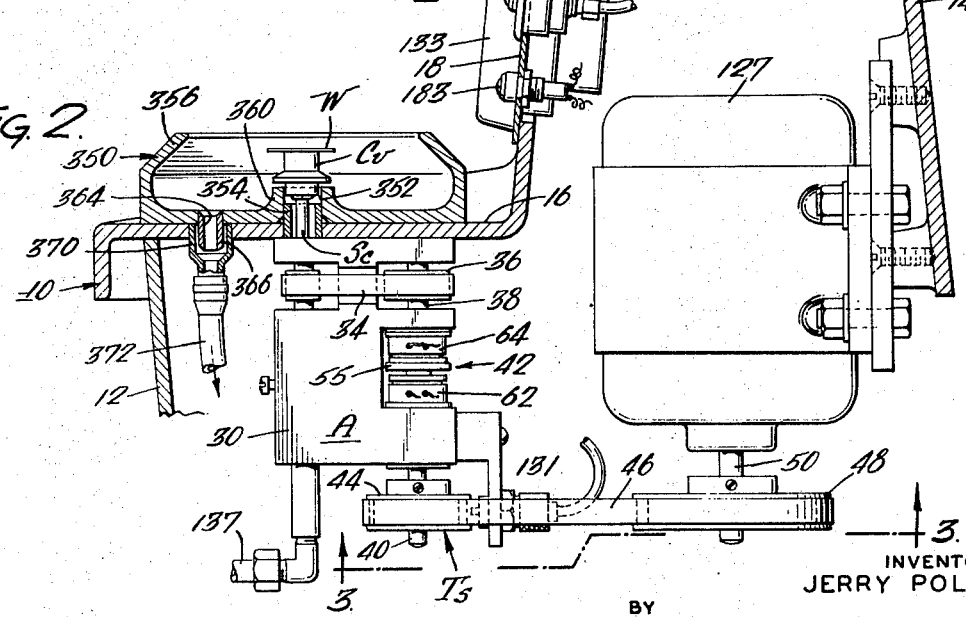
FIG. 2 is an enlarged sectional view taken on lines 2–2 of FIG. 1 showing a portion of the transmission system for rotating the work-supporting chuck.

Referring now to the drawings and particularly to FIGS. 1 and 2 thereof, there is illustrated apparatus in accordance with the present invention for applying a flowable substance such as a photosensitive material to one face of a workpiece for example, a disclike silicon wafer W. The apparatus A includes an outer casing 10 comprising, in the present instance, a base or lower housing section 12 and a console 14 overlying the open side of the base and having a counter or table top 16 disposed in a substantially horizontal plane and a vertically oriented panel 18 for mounting the various switch controls and indicators. The unit is thus suited for free standing or may be recessed in an opening in a workbench, the overhanging peripheral edge of the top section 14 engaging the workbench around the opening therein.

Figure 8:
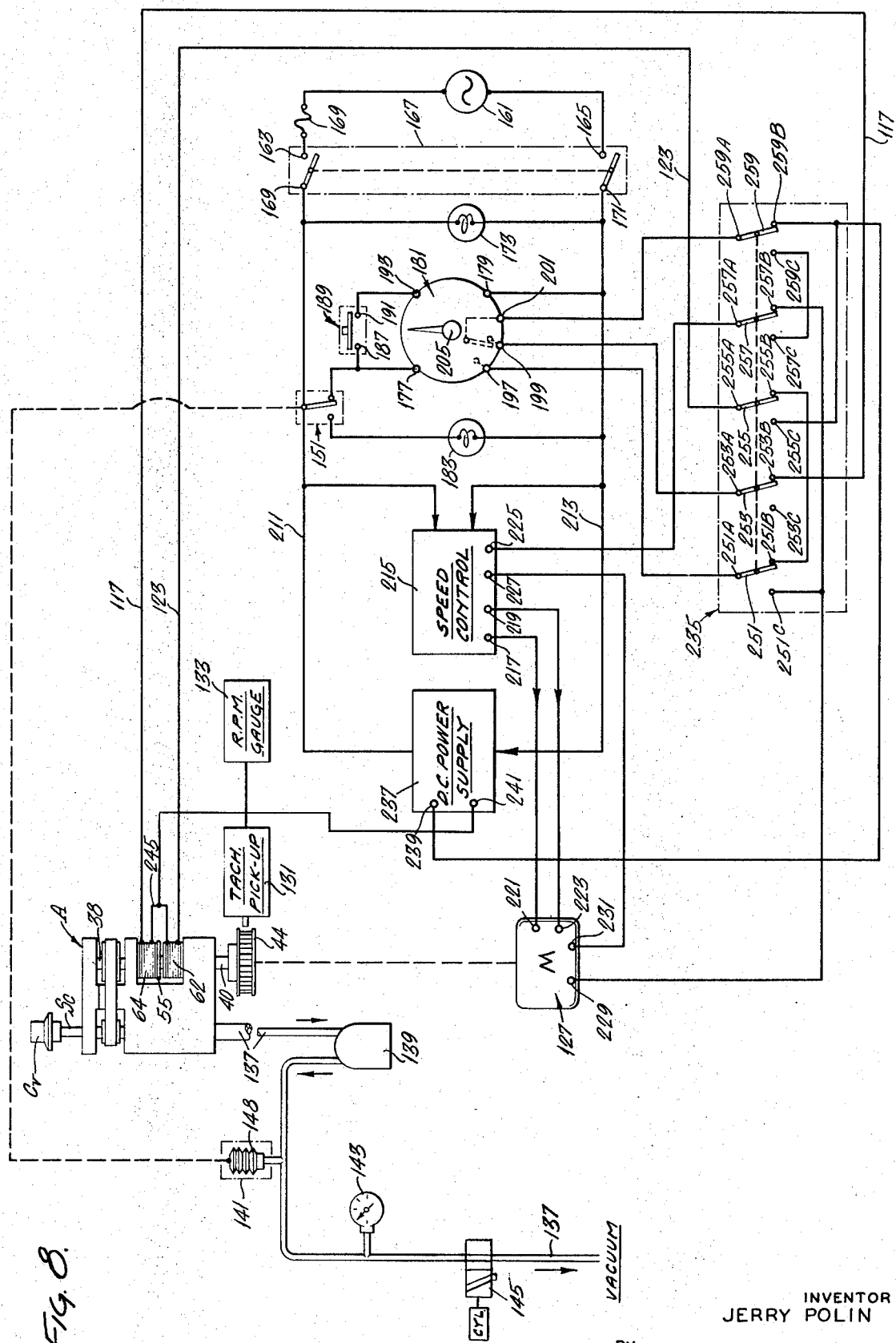
FIG. 8 is a diagrammatic electric control system of the apparatus of the present invention.

Considering first the broad structural details of the apparatus in terms of function and with particular references to FIGS. 4 and 8, the workpiece or wafer W is supported on the flat face F of a vacuum chuck $C_v$ during the spinning cycle, the vacuum chuck being disposed centrally of a bowl and removably seated on a chuck shaft $S_c$ for rotation therewith. As illustrated, the chuck shaft $S_c$ is hollow and is adapted to be connected to a suitable source of vacuum to hold the workpiece on the face of the chuck during the spinning operation. The chuck shaft $S_c$ is driven through a transmission system broadly designated $T_s$ including a prime actuator such as the motor M. Accordingly, in a typical cycle of operation the operator places a wafer W on the face F of the vacuum chuck $C_v$ and then draws a vacuum to secure the wafer in place on the chuck. Thereafter, a suitable quantity of photosensitive material is deposited on the upper face of the wafer W and the system started to rotate the chuck shaft through the transmission system $T_s$ and motor M. After a predetermined spinning cycle, during which time the wafer W is accelerated in a predetermined time interval to a predetermined speed, the photosensitive material is dispersed uniformly over the surface of the wafer, the speed and acceleration being controlled in such a manner that in the case of photoresist the solvents are driven off and the solid particles are retained on the face of the wafer to provide a hardened layer of photosensitive material. At the end of the cycle the chuck shaft is stopped and the vacuum released so that the coated wafer may be removed for further processing.

Considering now the details of the transmission system $T_s$ for effecting rotation of the chuck shaft $S_c$, the chuck shaft is rotatably journaled or supported in a blocklike body or housing 30 and mounts a pulley 32 adjacent its lower end which in turn is connected by a belt 34 to a pulley 36 of larger diameter mounted adjacent the upper end of a driven shaft 38. The pulley 32 has a slightly crowned peripheral sidewall to guide and prevent slippage of the belt 34 at high speeds. The driven shaft 38 which is laterally disposed relative to the chuck shaft $S_c$ and a drive shaft 40 axially aligned with the driven shaft 38 are also journaled in the body 30. The transmission system further includes a drive shaft 40 adapted to be coupled selectively to drive the driven shaft 38 through an electromechanical actuator and brake means broadly designated 42. The drive shaft 40 mounts a sprocket 44 at its lower end connected by a timing belt 46 to a sprocket 48 of larger diameter mounted on the output shaft 50 of the motor M. Conventional ball bearings support the chuck shaft $S_c$, driven shaft 38 and drive shaft 40 for rotation in the housing 30. Further, in the present instance the diameters $D_1$ and $D_2$ of the pulleys 32 and 36 are sized to provide a 2:1 increase in output to the chuck shaft $S_c$ from the driven shaft and the diameters $D_3$ and $D_4$ of the sprockets 44 and 48 are also sized to provide a 2:1 step-up so that the motor shaft output is a 4:1 ratio to the chuck shaft $S_c$.

As best illustrated in FIG. 4, the electromechanical means 42 for selectively establishing a driving connection between the drive and driven shafts comprises a stationary brake plate 52 confronting and spaced from a clutch plate 54 mounted for rotation at the upper terminal end of the drive shaft 40. A control disc 55 is mounted in the gap between the plates 52 and 54 and has a square opening 56 within which is disposed a square lug follower 58 mounted at the lower terminal end of the driven shaft 38. By this arrangement, when the clutch plate 54 is magnetized through energization of clutch coil 62, the control disc is attracted to clutch plate 54 to establish a driving connection between shafts 38 and 40. Deenergization of clutch coil 62 and energization of brake coil 64 to magnetize stationary brake plate 52 causes the control disc 55 to engage brake plate 52 to stop rotation of driven shaft 38 and chuck shaft $S_c$.

In accordance with the present invention a control system is provided for rapidly accelerating a workpiece such as a wafer W to a predetermined selectively variable speed to disperse a flowable substance uniformly over one face thereof. In the present instance the control system provides a dual acceleration, one termed hereinafter a "fast" acceleration range and the other a "slow" acceleration range. The control system also includes "safety cutoff" means adapted to interrupt the spinning cycle if the vacuum holding the workpiece drops below a predetermined level or to prevent initiation of a cycle unless the vacuum is at a predetermined level to prevent damage to the workpiece or injury to an operator. It is noted that even though two acceleration ranges are shown and described, other ranges are possible by variations in the transmission system. FIG. 8 illustrates diagrammatically, by way of example only, a complete system in accordance with the invention including one possible form of electrical control system for providing the desired operation set forth hereinafter in detail. While various other automatic and manual controls may also be incorporated in the system for particular applications, the circuit now to be described provides the necessary basic operations.

Referring now to FIG. 8 in detail, the apparatus A corresponds to the mechanical apparatus described hereinbefore in detail for accomplishing the required spinning of the vacuum chuck shaft $S_c$. The brake control coil 64 included therein is connected at its lower end to a reference potential, and is responsive to voltage applied to its upper end by way of brake control lead 117 to actuate control rotor 55 to its upper or braking position. Clutch control coil 62 is connected to the same reference potential at its upper end, and is responsive to voltage applied to its lower end over clutch control lead 123 to operate control disc 55 to its lower or clutch-engaging position.

Motor 127 is mechanically coupled to drive shaft 38 which, as described in detail hereinbefore, operates by way of a transmission to rotate the vacuum chuck shaft $S_c$. Tachometer pickup 131 responds to rotation of the teeth of the sprocket 44 on the lower end of shaft 40 to produce an electrical signal having a frequency indicative of the rate of rotation of the vacuum chuck shaft $S_c$, which electrical signal is supplied to the r.p.m. gauge 133 to provide indications of vacuum chuck shaft speed.

The vacuum line 137 includes a suitable filter bowl 139 of conventional form, a conventional vacuum detector switch arrangement 141, a vacuum gauge 143, and a vacuum line switch 145 which may be of a known form actuatable by means of a pneumatic switch 147 between the first position shown in solid lines in which it connects vacuum line 137 to a suitable vacuum source (not shown), and a second position shown in broken lines in which the vacuum line 137 is vented to atmosphere in response to operation of pneumatic switch 147.

Vacuum detector switch arrangement 141 typically comprises a bellows 148 mechanically coupled to a single-pole double-throw switch 151 so that the switch 151 is in the switch position shown in the diagram when an adequate vacuum is present in line 137, but is actuated to its alternate position should the vacuum disappear or become inadequate for operation.

The remainder of the system shown in FIG. 8 comprises the electrical elements and circuitry required to produce the desired coordinated operation of the brake control coil 64, the clutch control coil 62 and the drive motor M.

More particularly, the opposite terminals of a source of alternating line voltage 161 are connected to the input contacts 163 and 165 respectively of double-pole, single-throw power switch 167. A conventional over-current fuse 169 is connected in series between the AC source and contact 163 for protective purposes. The corresponding respective output terminals 169 and 171 of switch 167 are connected to opposite sides of a power-on pilot lamp 173, which lamp becomes illuminated only upon the closing of power switch 167.

When power switch 167 is closed, alternating line voltage is applied between the energizing terminals 177 and 179 of timer 181, provided the vacuum detector switch 151 is in the position shown, as it will be when an adequate vacuum is present in the vacuum line 137. Should the vacuum in the line 137 be reduced below an operating level, vacuum actuator switch 151 will be changed to its alternate position, which removes energizing voltage from terminal 177 of the timer, thereby rendering it inoperative, and connects vacuum failure lamp 183 across the power line so that the latter lamp becomes illuminated to provide an indication of vacuum failure. With an adequate vacuum, however, switch 151 remains in the position shown and supplies voltage not only to energizing terminal 177 of timer 181, but also to one terminal 187 of intermittent-contact push-button start switch 189. Manual operation of start switch 189 connects terminal 187 to the other terminal 191 of the start switch and thereby also supplies AC voltage to the start-control terminal 193 of timer 181.

Timer 181 may be a conventional, commercially available timer having three controlled terminals 197, 199 and 201. The internal connections of timer 181 normally connect terminal 201 to terminal 199, but the timer is operative, in response to operation of start switch 189, while terminals 177 and 179 are energized, to connect terminal 201 to terminal 197 for a time determined by the setting of the manually adjustable timer adjustment knob 205; after this time interval, terminal 201 is automatically reconnected to terminal 199. The effects of these operations of the timer will be set forth in detail hereinafter.

The AC power leads 211 and 213 are also connected to the speed control 215, one pair of output terminals 217 and 219 of which are permanently connected to the field terminals 221 and 223 of motor 137. The other pair of output terminals 225 and 227 of speed control 215 are connected to the armature terminals 229 and 231 respectively of the motor 127. Terminals 227 and 231 are permanently and directly interconnected, while terminals 225 and 229 are interconnected by way of the above-described timer control terminals and by way of five-pole double-throw switch 235 as described hereinafter.

AC power leads 211 and 213 are also connected to supply AC power to the DC power supply 237, which may be a conventional rectifying and filtering circuit for producing a direct supply voltage at its output terminals 239 and 241. In this example it is assumed that the lower DC power supply outlet terminal 241 is connected to the same fixed reference potential as is the interconnection 245 between the brake control coil 64 and the clutch control coil 62.

The five-pole switch 235 comprises five switch poles ganged together for simultaneous operation between two different positions; in the position of the switch arms shown in FIG. 8, rapid acceleration is provided for vacuum chuck shaft Sc, while in the alternate position of five-pole switch 235, a slower acceleration is provided thereby providing the dual-acceleration feature referred to hereinabove. More particularly, the switch arms 251, 253, 255, 257 and 259 are permanently connected to respective switch terminals 251A, 253A, 255A, 257A, and 259A. In the fast-acceleration condition of five-pole switch 235, the switch arms 251—259 are connected, respectively, to switch contacts 251B, 253B, 255B, 257B, and 259B. In the alternate, or slow-acceleration position of switch 235, the switch arms 251—259 are connected respectively to the switch contacts 251C, 253C, 255C, 257C, and 259C.

Switch contact 251A is connected directly to timer terminal 197; switch contact 253A is connected directly to timer terminal 199; switch contact 255A is connected directly to the clutch control lead 123; switch contact 257A is directly connected to speed control output terminal 225; and switch contact 259A is connected directly to timer terminal 201.

Switch contact 251C is connected directly to switch contact 257B and also to armature terminal 229 of motor 127; switch contact 253C is not connected to anything. Switch contact 251B is directly connected to switch contact 255B; switch contact 253B is directly connected to the brake control lead 117; switch contact 255C is connected to switch contact 259B; and switch contact 257C is connected directly to switch terminal 259C; and switch terminal 259B is directly connected to the output terminal 239 of the DC power supply 237.

With five-pole switch 235 in the position shown, closing of main power switch 167 lights power-on pilot lamp 173 and, provided a suitable vacuum is present in the vacuum line 137, supplies energizing potential to terminals 177 and 179 of timer 181. At the same time, input AC power is supplied to speed control 215 and to DC power supply 237. The motor 127 therefore begins to run at a speed determined by the adjustment of speed control 215, since the motor field is directly connected to output terminals 217 and 219 of the speed control 215, the armature terminal 231 is directly connected to speed control terminal 227, and motor armature terminal 229 is connected to speed control terminal 225 by way of pole 257 of the five-pole switch 235. At this same time, brake control coil 64 is maintained energized, since output terminal 239 of DC power supply 237 is connected to brake control lead 117 by way of switch arm 259, the interconnection within timer 181 of timer terminals 201 and 199 and the switch arm 253. Accordingly, the motor is operating but the vacuum chuck shaft Sc is not rotating at this time.

If now the start switch 189 is momentarily actuated by the operator, timer 181 operates to connect timer terminal 201 to timer terminal 197, instead of to terminal 199, and this connection persists for a timer period determined by the setting of the timer control knob 205. This serves to disconnect the output terminal 239 of the DC power supply from the brake control lead 117, and connect it instead to the clutch control lead 123 by way of switch arm 251 and switch arm 255. This in turn causes the clutch to energize so that the vacuum chuck shaft Sc is rapidly accelerated up to a speed determined by the setting of the speed control 215, at which speed it runs until timer 181 reconnects its terminal 201 to its terminal 199; at this time the clutch control coil is again deactuated and the brake control coil reactuated, thereby to arrest rotation of the vacuum chuck shaft Sc.

If, instead, slow acceleration of vacuum chuck shaft Sc is desired, the five-pole switch 235 is manually thrown to its alternate position prior to closing of the power switch 167. Then when power switch 167 is turned on, the timer 181, the speed control 215 and the DC power supply 237 are all energized from the AC power source. The output terminal 239 of the DC power supply 237 is permanently connected to contact 255C of the five-pole switch 235, so that under the conditions described, operating power is supplied to the clutch control lead 123 by way of switch arm 255, and is disconnected from the brake control lead 117 by the operation of switch arm 259. Accordingly, the control rotor 55 is placed in its clutch-engaged position.

When the operator then momentarily actuates the start switch 189, timer terminal 201 is automatically connected to timer terminal 197, rather than to terminal 199 for a time period determined by the setting of the timer 205. This causes output terminal 225 of speed control 215 to be connected to armature terminal 229 of motor 127 by way of switch arm 257, switch arm 259, the internal connection in timer 181 between its terminals 201 and 197, and switch arm 251. The motor is thereby caused to start up with the clutch engaged, as is desired for slow acceleration of the vacuum chuck shaft Sc.

Considering now briefly the operation of the apparatus described above, and assume that it is desired to apply a flowable substance to the wafer W in the "rapid" accelerational range. Thus, initially the five-pole switch 235 is in the position shown in FIG. 8 wherein the switch arms 251—259 are connected to the switch contacts 251b—259b. With the five-pole switch 235 in this position, the main power switch 167 is closed which lights the power-on pilot lamp 173 and at the same time input AC power is supplied to speed control 215 and to DC power supply 237. The motor 127 therefore begins to run and the speed thereof may be selectively controlled by adjustment of the speed control 215. The operator then adjusts the speed control of the motor 127 to provide the desired speed of rotation of the chuck shaft Sc. For example, if it is desired to operate the chuck shaft Sc at 10,000 r.p.m. the motor speed is set at 2500 r.p.m. and by reason of the 4:1 ratio, the speed of the chuck shaft will be 10,000 r.p.m. Operation of the motor at this speed rotates drive shaft 40 and clutch plate 54 at 5000 r.p.m. It is noted that at this time the brake coil 64 is energized whereby the control disc 55 is attracted to the brake plate 52 and the driven shaft 38 is at rest. The brake control coil is maintained energized since the output terminal 239 of DC power supply 237 is connected to brake control lead 117 by way of switch arm 259, the interconnection within timer 181 of timer terminals 201 and 199 and the switch arm 253. Accordingly the motor is operating but the vacuum shaft Sc is not rotating at this time.

Thereafter the operator places a wafer W on the vacuum chuck Cv and actuates the pneumatic control switch 145 to the on position to connect the line 137 to the vacuum source. If a suitable vacuum is in the line to the vacuum chuck Cv, energizing potential is supplied to terminals 177 and 179 of timer 181. The operator then sets the timer for the desired time of the spinning cycle, for example 8 seconds, and deposits a predetermined quantity of the flowable substance on the upper face of the wafer. The apparatus is now set for the spinning cycle.

The operator then depresses a start switch 189 momentarily and the timer operates to disconnect the output terminal 239 of the DC power supply from the brake control lead 117 and connect instead to the clutch control lead 123 by way of switch arms 251 and 255. Thus the control disc is attracted to the clutch plate 54 and the vacuum shaft through belt 34 and driven shaft 38 is rapidly accelerated up to a speed determined by the setting of the speed control 215 in the present instance at 10,000 r.p.m. in about 10 ms. or about 1000 r.p.m. per ms. The chuck shaft Sc rotates at this speed until the timer 181 reconnects its terminal 201 to its terminal 199 for example at the termination of the spinning cycle. At this time the clutch control coil is again deactuated and the brake control coil reactuated to arrest rotation of the vacuum chuck shaft Sc at the end of the cycle. The operator then positions the pneumatic switch 145 in the off position which releases the vacuum in the line 137 and permits the operator to remove the finished wafer W. If during the spinning cycle the vacuum on the chuck Cv is reduced below a predetermined operating level, vacuum actuator switch 151 of vacuum-detector switch arrangement 141 is changed to its alternate position removing energizing voltage from the timer thereby rendering it inoperative and immediately deenergizing the clutch coil and energizing the brake control to arrest rotation of the chuck shaft Sc. It is noted that if a vacuum leak in the system occurs during the spinning operation, the chuck shaft Sc is immediately arrested. However, the filter 139 provides a residual vacuum to the chuck shaft as an additional safety factor.

If it is desired to operate at the "slow" acceleration range, the five-pole switch 235 is now positioned so that the switch arms 251—259 are connected to the switch contacts 251c—259c. Now with the timer set for the desired spinning cycle, vacuum is applied to the system to hold the wafer on the vacuum chuck Cv through the switch 145, the power switch is turned on and accordingly the timer 181, speed control 215 and DC power supply 237 are all energized from the AC power source. Under these conditions, operating power is supplied to the clutch control lead 123 and disconnected from the brake control lead 177 by operation of switch arm 259. Accordingly, the control disc 55 is in the clutch engaging position whereby the chuck shaft Sc is directly connected to the motor when the power switch 189 is turned on. This produces a slower acceleration of the chuck shaft Sc for example, 10,000 r.p.m. in about 120 ms. It is noted that the speed of the chuck shaft Sc may be selectively varied at this time through speed control 215 with or without a wafer W on the vacuum chuck and prior to application of a predetermined quantity of photoresist to the wafer.

The following shows in chart form a series of tests in which a layer of photosensitive material was applied to wafers W in accordance with the method and apparatus of the present invention.

TEST 1

Rapid Acceleration (A) Flowable substance—A photosensitive material, the solubility of which in a particular solvent varies with exposure to radiation, [sold under the tradename KPR by Eastman Kodak Company] having 12cp. viscosity.
Wafer W—1" diameter, 0.008" thickness or cross section.

| Speed of vacuum chuck $V_c$ (r.p.m.) | Time to achieve indicated speed, ms. | Thickness of layer of photosensitive material, A. |
|---|---|---|
| 2,000 | 2 | 2,600 |
| 5,000 | 5 | 1,875 |
| 8,000 | 8 | 1,227 |
| 10,000 | 10 | 994 |

Slow Acceleration (B) Flowable substance—A photosensitive material, the solubility of which in a particular solvent varies with exposure to radiation, [sold under the tradename KPR by Eastman Kodak Company] having 7% of solids.
Wafer W—1⅝" diameter, 0.008" thickness or cross section.

| Speed of vacuum chuck $V_c$ (r.p.m.) | Time to achieve indicated speed, ms. | Thickness of layer of photosensitive material, A. |
|---|---|---|
| 2,000 | 24 | 3,100 |
| 5,000 | 60 | 1,976 |
| 8,000 | 96 | 1,625 |
| 10,000 | 120 | 1,446 |

TEST 2

Flowable substance—A photosensitive material, the solubility of which in a particular solvent varies with exposure to radiation, [sold under the tradename KPR by Eastman Kodak Company] having 7% of solids.
Wafer W—1⅝" diameter, 0.008" thickness or cross section.

| Speed of vacuum chuck $V_c$ (r.p.m.) | Time to achieve indicated speed, ms. | Thickness of layer of photosensitive material, A. |
|---|---|---|
| 1,990 | 2 | 2,700 |
| 3,860 | 4 | 1,890 |
| 5,450 | 5.5 | 1,450 |

TEST 3

Flowable substance—A photosensitive material, the solubility of which in a particular solvent varies with exposure to radiation, [sold under the tradename KTFR by Eastman Kodak Company] having 14% of solids.
Wafer W—1⅝" diameter, 0.008" thickness or cross section.

| Speed of vacuum chuck $V_c$ (r.p.m.) | Time to achieve indicated speed, ms. | Thickness of layer of photosensitive material, A. |
|---|---|---|
| 1,990 | 2 | 13,500 |
| 3,860 | 4 | 8,640 |
| 7,460 | 7.5 | 5,670 |

Considering now other features of the invention, the specific structural details and mounting arrangement of the vacuum chuck $Cv$ and the chuck shaft $Sc$ is designed to minimize vacuum leakage at the high speeds attained during the spinning cycle. To this end the vacuum chuck $Cv$, which is thimblelike in configuration having a cylindrical bore 300 extending inwardly from its lower face, is provided with a tapered frustoconical shoulder 302 at the lower edge of the bore 300 to seat against an O-ring 304 supported in a groove 306 in the chuck shaft $Cv$. The O-ring 304 is positioned relative to the tapered shoulder so that the upper terminal end of the chuck shaft $Cv$ is spaced slightly from the inner end of the pocket 300 until a vacuum is applied in the system. The vacuum chuck $Cv$ is provided with an array of ports 301 in the work supporting face F which communicate with the bore in the chuck shaft to apply the vacuum more effectively over the face of the wafer W.

Now when a vacuum is drawn, the wafer W is drawn tightly against the work supporting face F of the chuck and the vacuum chuck is displaced downwardly and resiliently supported against the O-ring 304. This provides a tight seal at this juncture to prevent leakage of vacuum and insures that when the vacuum is released, the chuck $Cv$ may be readily removed. Further this arrangement insures a tight, firm driving relationship between the chuck shaft $Sc$ and chuck $Cv$ during the spinning cycle, eliminating the need for fasteners such as keyways and setscrews to hold the chuck in place, which would have a tendency to damage the shaft and make it difficult to remove when desired.

The chuck shaft $Sc$, as illustrated, is supported for rotation on a hollow stationary shaft 312 mounted in the body which in turn is connected to the line 137 communicating with the vacuum source. In order to minimize leakage at the juncture of the chuck shaft and vacuum shaft and also to minimize wear of the engaging surfaces of the shafts, for example, resulting from caking of photosensitive material on these surfaces, the lower terminal end of the chuck shaft $Sc$ is provided with a tapered circumferentially extending surface 310 which seats in a frustoconical end face 311 of a Teflon plug 314 mounted in a recess 316 in the upper axial end of the stationary shaft 312. It is noted that the plug 314 has a frustoconical end face at its opposite end so that the plug may be reversed after a predetermined period of use and normal wear. The stationary shaft has a flat 326 so that it may be locked against rotation in the body by means of a setscrew 322. The mating frustoconical surface and seat of the chuck shaft and plug insure a tight seal at this juncture eliminating the possibility of vacuum leakage at this point. It is noted that the contact area of the mating frustoconical surface and the chuck shaft and plug are comparatively small to reduce friction.

Further, it is noted that the central bore of the chuck shaft is smaller than the bore 323 of the plug so that any leakage through the chuck shaft, for example, during normal operation or in cleaning, passes beyond the juncture of the tapered shoulders and does not break the vacuum at this juncture. This arrangement also insures direct passage of any liquid past the juncture of the shafts precluding caking on the mating frustoconical surface which would cause wear. It is noted that the removability of the stationary shaft provides an easy means for cleaning this part of the system.

The vacuum chuck is disposed centrally of a bowl 350 mounted on the table top 16 of the housing, the bowl having a central opening 352 through which the chuck shaft $Sc$ projects. The bowl 350 is located in a fixed position on the table top by means of a sleeve 354 press fitted in an opening in the table top. The bowl 350 has an outer circumferentially extending sidewall 356 which is inwardly convergent and whose upper edge is above the level of the workpiece. Accordingly, during the spinning operation, the photosensitive material spun off the workpiece is deflected by the sidewall 356 to prevent splash-back or cobwebbing. The bowl has an upstanding collar 360 adjacent the central opening which has a sweeping outer contour to merge with the circumferentially extending deflector flange $Df$ of the vacuum chuck to prevent photosensitive material from leaking downwardly in the system, for example, in the area of bearings supporting the chuck shaft.

The bowl 350 is also provided with a discharge port 364 defined by a tubular extension 366 engaging interiorly of a downwardly depending sleeve 370 press fitted in the table top 16 to aid in locating the bowl on the table top. A flexible line 372 is connected to the sleeve 370 which may be connected to an accumulation system including vacuum means for exhausting liquids and vapors.

While particular embodiments of the present invention have been illustrated and described herein, it is not intended to limit the invention to such disclosure, and changes and modifications may be made within the scope of the following claims.

I claim:

1. Apparatus for applying a flowable substance to one surface of a workpiece comprising a rotatable vacuum chuck adapted to be connected by a conduit means to a suitable source of vacuum to support a workpiece on the work-supporting face thereof, a transmission system for connecting the vacuum chuck for rotation to a suitable power source, said system including control means whereby the vacuum chuck may be accelerated as high as 1,000 r.p.m. per ms., vacuum sensing means operatively associated with the transmission system to prevent rotation of the vacuum chuck when the vacuum falls below a predetermined level, and reservoir means in said conduit adapted to maintain a residual vacuum to said vacuum chuck when the vacuum in the conduit means between said reservoir and said vacuum source falls below a predetermined level as determined by said vacuum sensing means.

2. Apparatus as claimed in claim 1 wherein said reservoir means includes a filter to maintain the vacuum system free of foreign particles.

3. Apparatus as claimed in claim 1 wherein said vacuum chuck is mounted at one end of a chuck shaft connected to a power source by means of the transmission system.

4. Apparatus as claimed in claim 3 wherein said apparatus includes a body member and the terminal end of the chuck shaft opposite said one end is provided with a tapered circumferentially extending surface which seats in a frustoconical end face of a Teflon plug supported in the body member.

5. Apparatus as claimed in claim 3 wherein said vacuum chuck has a cylindrical bore therein which fits over said one end of the chuck shaft, said lower edge of the bore terminating in a tapered frustoconical shoulder adapted to seat against an O-ring mounted on the chuck shaft.

6. Apparatus as claimed in claim 3 wherein said transmission system includes a driven shaft rotatably mounted in the body member, means connecting the driven member and vacuum chuck for rotation, a drive shaft rotatably mounted in the body members and connected to the power source for rotation and electromechanical means for selectively establishing a driving relation between the drive and driven shafts.

7. Apparatus as claimed in claim 6 wherein said electromechanical means comprises a stationary brake plate, a control coil for the brake plate, a clutch plate mounted for rotation with the drive shaft, a clutch coil and a control disc connected for rotation with the driven shaft, and means for selectively energizing and deenergizing the brake and clutch coils whereby a driving relationship is established between the drive and driven shafts upon energization of the clutch coil to establish through the transmission system rotation of the chuck shaft from the power source and energization of the brake coil attracting the control disc to disconnect the chuck shaft from the power source.